W. R. WHITE.
COTTON BOLL WEEVIL DESTROYER.
APPLICATION FILED AUG. 9, 1916.
1,204,101.
Patented Nov. 7, 1916.
2 SHEETS—SHEET 1.
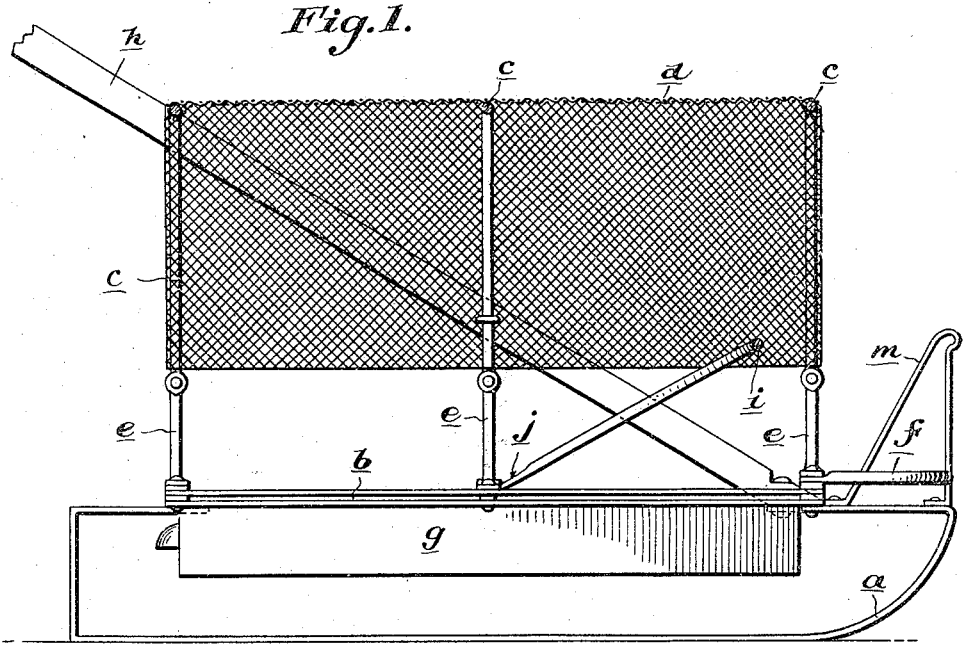
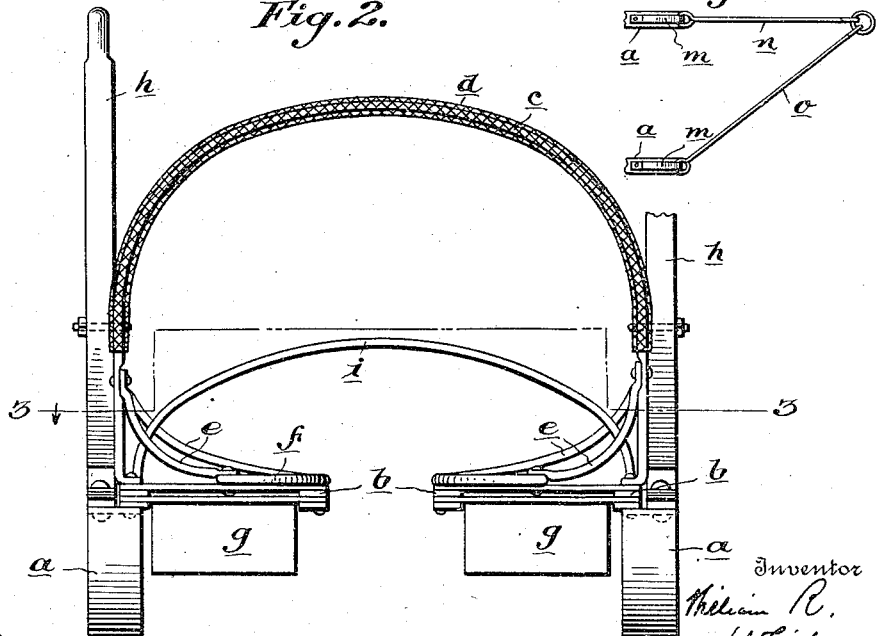

W. R. WHITE.
COTTON BOLL WEEVIL DESTROYER.
APPLICATION FILED AUG. 9, 1916.
1,204,101.
Patented Nov. 7, 1916.
2 SHEETS—SHEET 2.
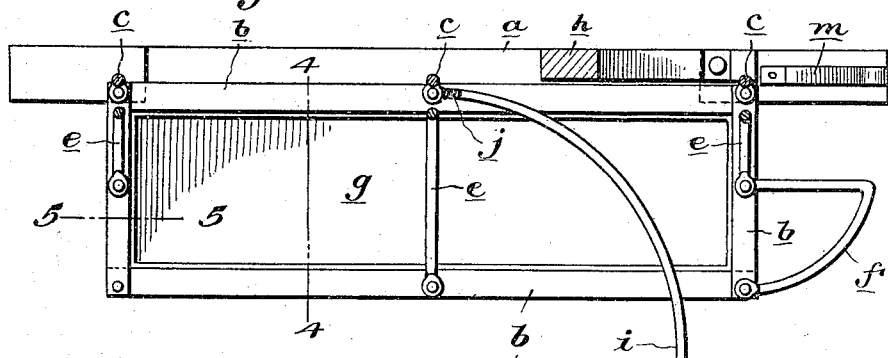
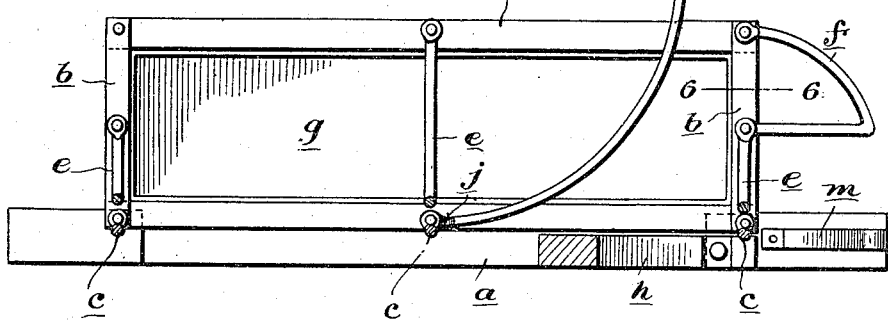
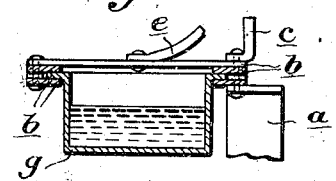
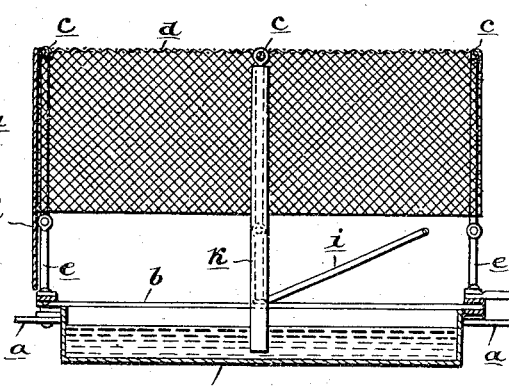
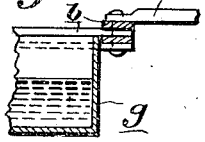

UNITED STATES PATENT OFFICE.

WILLIAM R. WHITE, OF TROY, ALABAMA.

COTTON-BOLL-WEEVIL DESTROYER.

1,204,101.

Specification of Letters Patent.

Patented Nov. 7, 1916.

Application filed August 9, 1916. Serial No. 113,937.

*To all whom it may concern:*

Be it known that I, WILLIAM R. WHITE, a citizen of the United States, residing at Troy, in the county of Pike and State of Alabama, have invented certain new and useful Improvements in Cotton-Boll-Weevil Destroyers, of which the following is a specification.

This invention has relation to that type of apparatus adapted to be pushed or drawn along the rows of cotton and provided with means whereby the weevils are shaken off the plants and caused to fall into pans of kerosene or other destructive liquids; and the invention consists of certain novel features of construction hereinafter described and claimed.

Referring to the drawings annexed: Figure 1 is a side elevation, and Fig. 2 is a front elevation of my apparatus. Fig. 3 is a horizontal section on the line 3—3 of Fig. 2. Figs. 4, 5 and 6 are detail sections on the corresponding lines on Fig. 3. Fig. 7 is a vertical sectional view showing additional features. Fig. 8 is a detail plan view showing a preferred draft attachment.

Referring to the drawings annexed by reference characters, $a$ designates a pair of runners, each of which has attached rigidly to its upper edge a rectangular metal frame $b$ projecting inwardly from the runners, these two frames terminating quite close to each other so as to leave but a narrow longitudinal central space between them. These frames are rigidly connected by upwardly extending bowed metal rods $c$ over which is fastened a covering of wire screen $d$, which forms a transparent hood extending the length of the frames. The bows $c$ are braced to the frames $b$ by curved braces $e$.

To guide the plants into the space between the frames is provided a pair of forwardly projecting guides $f$. In each of the rectangular frames is mounted a pan-like tray $g$ which is adapted to be removed from the machine by being slid out rearwardly. The pans or trays are adapted to hold kerosene or other liquid that will either kill or render inactive the weevils that may fall into the pan. A pair of plow handles $h$ is attached to the apparatus in any suitable manner, preferably by having the forward ends bolted to the frames $b$ at the forward ends thereof and being bolted to the central hood bows $c$, thereby not only securely fastening the handle but also assisting in bracing the hood.

Fastened to the outer longitudinal bars of the frames $b$ are the lower ends of a bowed metal rod $i$, this rod extending upwardly and forwardly and across the channel or space between the frames. In operation, the machine is drawn along so that the rows of plants will pass between the frames $b$. The forward upper edge of the bow $i$ contacts with the upper parts of the plants and bends them forwardly and gently spreads them apart toward the opposite sides of the machine. As the apparatus progresses, the plants are released from the bow and resume an upright position; in this way the plants are gently but thoroughly agitated or shaken sufficiently to dislodge the weevils as well as the infected buds, and are in such position that they fall into the oil carrying pans. The hood confines the weevils to the apparatus and insures them falling into the pans, and this hood being transparent, the operation is visible to the operator, thus enabling him to observe the operation of the agitating bow $i$ and be sure that it is operating properly. The bow $i$ is adjustable upwardly and downwardly to adjust it to plants of different sizes and kinds, this adjustment being best secured by simply bending the rod at points near where it is attached to the frames $b$, the ends of the rod being flattened at $j$ to permit ready bending. From time to time the pans may be slid out of the machine, and if kerosene be employed, the oil may be set on fire and thus quickly and completely destroy the insects and eggs.

It will be understood that the hood may be made of any desirable length and that any number of agitating bows $i$ may be employed. It is also understood that if desired additional agitating means may be employed; for instance, a series of depending flail rods $k$ may be hung from one or more of the bows $c$, as shown in Fig. 7. It will also be understood that to more securely confine the dislodged insects, I may employ a depending curtain $l$, as shown in said Fig. 7, this curtain being located at the rear end of the machine and being split in the middle to permit the plants to pass without injury. This curtain may be coated with kerosene or any other suitable substance that will when smeared over the plants cause the remaining weevils to either die or leave the plants.

It will be understood further that instead of runners, I may employ wheels as a transporting means. The apparatus may be adapted to be pushed or pulled, over the ground, either by beast or by man or by a motor. I prefer that the device should be adapted to be drawn along by a single animal. When thus adapted, I attach to the forward end of each runner an upstanding draft iron m, so that the draft devices shall be located sufficiently high to avoid injury to the plants; and in order that the draft animal may walk in the space between the rows, that is, in a pathway in line with one of the runners, I attach the swingletree to a draft appliance consisting of a short draft rod n and a longer draft rod o, the latter being sufficiently long to extend from one of the draft irons m to a point in line with the opposite runner, whereby the draft will be equalized and the apparatus may be drawn along straight ahead with the animal walking in the pathway in alinement with one of the runners. It will be understood also that in addition to or instead of the oil to the pans, I may place a lamp or other fumigating apparatus within the hood, so that as the machine travels along the fumes will stifle and thus kill or stun the insects and also destroy the eggs thereof. It will be also understood that this apparatus may be employed for collecting and destroying bugs on Irish potato plants as well as other vines or plants.

I claim:—

1. In an apparatus of the class set forth, transporting devices, a pair of frames carried thereby and projecting inwardly therefrom, a removable tray or pan supported by each of these frames, a series of bowed rods connecting the frames and provided with a covering to form a hood, and means within the hood for agitating the plants as the stalks thereof pass between the adjacent edges of said frames, said means consisting of a bow extending upwardly and forwardly from the frames.

2. In an apparatus of the class set forth, transporting devices, a pair of frames carried thereby and projecting inwardly therefrom, a removable tray or pan supported by each of these frames, a series of bowed rods connecting the frames and provided with a covering to form a hood, and means within the hood for agitating the plants as the stalks thereof pass between the adjacent edges of said frames, said means consisting of a bow extending upwardly and forwardly from the frames, said bow being adjustable upwardly and downwardly.

3. In an apparatus of the class set forth, transporting devices, a pair of frames carried thereby and projecting inwardly therefrom, a removable tray or pan supported by each of these frames, a series of bowed rods connecting the frames and provided with a covering to form a hood, and means within the hood for agitating the plants as the stalks thereof pass between the adjacent edges of said frames, said means consisting of a bow extending upwardly and forwardly from the frames, said bow being bendable upwardly and downwardly.

In testimony whereof I hereunto affix my signature in the presence of two witnesses.

WILLIAM R. WHITE.

Witnesses:
J. W. SOLOMON,
L. R. WHITE.

Copies of this patent may be obtained for five cents each, by addressing the "Commissioner of Patents, Washington, D. C."